(12) United States Patent
Even Chen et al.

(10) Patent No.: US 11,630,516 B1
(45) Date of Patent: Apr. 18, 2023

(54) BRAIN-MACHINE INTERFACE (BMI) WITH USER INTERFACE (UI) AWARE CONTROLLER

(71) Applicant: Neuralink Corp., Fremont, CA (US)

(72) Inventors: Nir Even Chen, Redwood City, CA (US); Paul A. Merolla, Redwood City, CA (US); Joseph E. O'Doherty, San Francisco, CA (US)

(73) Assignee: NEURALINK CORP., Fremont, CA (US)

( * ) Notice: Subject to any disclaimer, the term of this patent is extended or adjusted under 35 U.S.C. 154(b) by 0 days.

(21) Appl. No.: 17/562,642

(22) Filed: Dec. 27, 2021

(51) Int. Cl.
*G06F 3/01* (2006.01)
*G06F 3/0484* (2022.01)

(52) U.S. Cl.
CPC ............ *G06F 3/015* (2013.01); *G06F 3/0484* (2013.01)

(58) Field of Classification Search
CPC ................................ G06F 3/015; G06F 3/0484
USPC ......................................................... 345/156
See application file for complete search history.

(56) References Cited

U.S. PATENT DOCUMENTS

| | | | | |
|---|---|---|---|---|
| 10,866,637 | B2* | 12/2020 | Bae | G06F 3/015 |
| 2011/0307079 | A1* | 12/2011 | Oweiss | A61B 5/4094 |
| | | | | 600/545 |
| 2016/0278713 | A1* | 9/2016 | Shoaran | A61B 5/7232 |
| 2017/0202518 | A1* | 7/2017 | Furman | G01R 33/4806 |

* cited by examiner

*Primary Examiner* — Calvin C Ma
(74) *Attorney, Agent, or Firm* — Kilpatrick Townsend & Stockton LLP (57) ABSTRACT

Methods involving interpreting signals from a brain-machine interface (BMI) are described, as well as methods involving adjusting an implanted or wearable BMI device. The method includes receiving neural signals from a brain of a subject into a BMI decoder. The method includes determining an activity change of the subject based on a sensor. The method includes routing the neural signals from a first model to a second model in the BMI decoder based on the determined activity change. The method includes translating, using the second model in the BMI decoder, the neural signals into a command. The method includes sending the command to a controller.

12 Claims, 10 Drawing Sheets

BRAIN-MACHINE INTERFACE (BMI) WITH USER INTERFACE (UI) AWARE CONTROLLER

CROSS-REFERENCES TO RELATED APPLICATIONS

NOT APPLICABLE

STATEMENT AS TO RIGHTS TO INVENTIONS MADE UNDER FEDERALLY SPONSORED RESEARCH AND DEVELOPMENT

NOT APPLICABLE

BACKGROUND

1. Field of the Invention

Embodiments of the present invention generally relate to healthcare information and communication technology specially adapted for the operation of medical devices. More specifically, embodiments relate to interpreting neural signals from a neural implant.

2. Description of the Related Art

Implantable devices can be implanted into neurological tissue, such as the brain, to form a brain-computer interface. In certain instances, the implantable devices can contain a biocompatible substrate with conduits for stimulation of neurons and/or recording neural signals. Such neural signals may be faint, analog, unprocessed signals, and may be preprocessed through analog-to-digital conversion, aggregation, and conversion to data packets and/or to human- or machine-readable formats, before being analyzed or otherwise processed by a computer within the implant and/or transmitted to another computer outside of the implant. The computer may include a BMI decoder for decoding the neural signals. The BMI decoder may output commands based on the decoded neural signals, such as commands for interacting with a graphical user interface or manipulating a physical device.

However, there are various challenges associated with decoding neural signals for outputting commands. For example, a machine learning-based BMI decoder may only be trained offline. Models for decoding the neural signals may only be updated with data relating to errors in decoding signals long after the errors occurred.

Additionally, any particular BMI decoder may be superb at decoding neural signals for one type of activity but be almost useless when used for another type of activity. Attempting to train a machine learning-based BMI in the other activity may dilute, or at least suboptimize, the training for the initial activity.

There is a need in the art for better, more robust BMI decoders that are good at many activities and can help users attain more independence.

BRIEF SUMMARY

Brain-machine interface (BMI) devices can be implanted into or worn by a subject. The BMI devices may transmit neural signals detected from the brain of the subject to a BMI decoder. The BMI decoder may translate the neural signals into a command based on an activity that the subject is attempting to perform. The BMI decoder may utilize a controller that incorporates feedback from the activity environment and from external sensors to adjust commands and switch between and/or update models in the BMI decoder.

Some embodiments of the present disclosure are related to a method of interpreting signals from a brain-machine interface (BMI). The method can include receiving neural signals from a brain of a subject into a BMI decoder, determining an activity change of the subject based on a sensor, routing the neural signals from a first model to a second model in the BMI decoder based on the determined activity change, translating, using the second model in the BMI decoder, the neural signals into a command, and sending the command to a controller.

The activity change can be a change between the subject interfacing with a graphical user interface (GUI) to the subject manipulating a physical device.

The activity change can be from the subject interfacing with a GUI to the subject manipulating a physical device.

Interfacing with the GUI can involve moving a cursor, entering text, or selecting words, and the manipulating a physical device involves operating a robotic arm or steering a wheelchair.

The method can additionally include converting, through an analog-to-digital converter (ADC), voltages or currents from the electrodes, detecting spikes from the voltages or currents, and forwarding the spikes as the neural signals.

The first or second model can include binning neural spikes as a function of frequency.

Some embodiments can include a method of interpreting signals from a BMI. The method can include receiving a first set of neural signals from a brain of a subject into a BMI decoder, translating, using a first model in the BMI decoder, the first set of neural signals into a first command, detecting, from further neural signals from the subject, a frustration from the subject, inhibiting the first command based on the detecting, routing a second set of neural signals from the brain of the subject to a second model in the BMI decoder based on the detecting, interpreting, using the second model, the second set of neural signals into a second command, and sending the second command.

The inhibiting can include sending a cancelation of the first command.

The second command can be sent to a cursor, a keyboard, a robotic arm, or a wheelchair.

The neural signals can pass through metal electrodes in a cerebral cortex of the brain.

The method can additionally include converting, through an analog-to-digital converter (ADC), voltages or currents from the electrodes, detecting spikes from the voltages or currents, and forwarding the spikes as the neural signals.

The first or second model can include binning neural spikes as a function of frequency.

Some embodiments include a method for adjusting an implanted or wearable BMI device. The method can include receiving neural signals from a brain of a subject into an implanted or wearable BMI device, determining an activity change of the subject based on a sensor, switching from a first compression algorithm to a second compression algorithm based on the determined activity change, compressing, using the second compression algorithm in the BMI device, the neural signals into a data stream, and sending the data stream to a BMI controller off-board the subject.

The neural signals can pass through metal electrodes in a cerebral cortex of the brain.

The method can additionally include converting, through an analog-to-digital converter (ADC), voltages or currents from the electrodes, detecting spikes from the voltages or currents, and forwarding the spikes as the neural signals.

The first or second model can include binning neural spikes as a function of frequency.

DETAILED DESCRIPTION

A brain-machine interface (BMI) decoder receives neural signals from neural implants. The BMI decoder may interpret the neural signals to cause a controller to perform actions, such as manipulating a physical device or interfacing with a graphical user interface (GUI). The BMI decoder may include models for various activities to interpret the neural signals into commands. The BMI decoder may utilize an environment-aware controller to perform the commands. The controller may receive feedback at varying frequencies from the environment in which the activity is being performed, as well as external information such as from sensors. The controller and the BMI decoder may be adjusted in real time based on the feedback. For example, the models may be re-trained based on feedback from the environment. In some examples, the controller and the BMI decoder may determine a change in activities based on the feedback. For example, the BMI decoder may switch between decoding neural signals for controlling a robotic arm to decoding neural signals for controlling a wheelchair.

Figure 1:
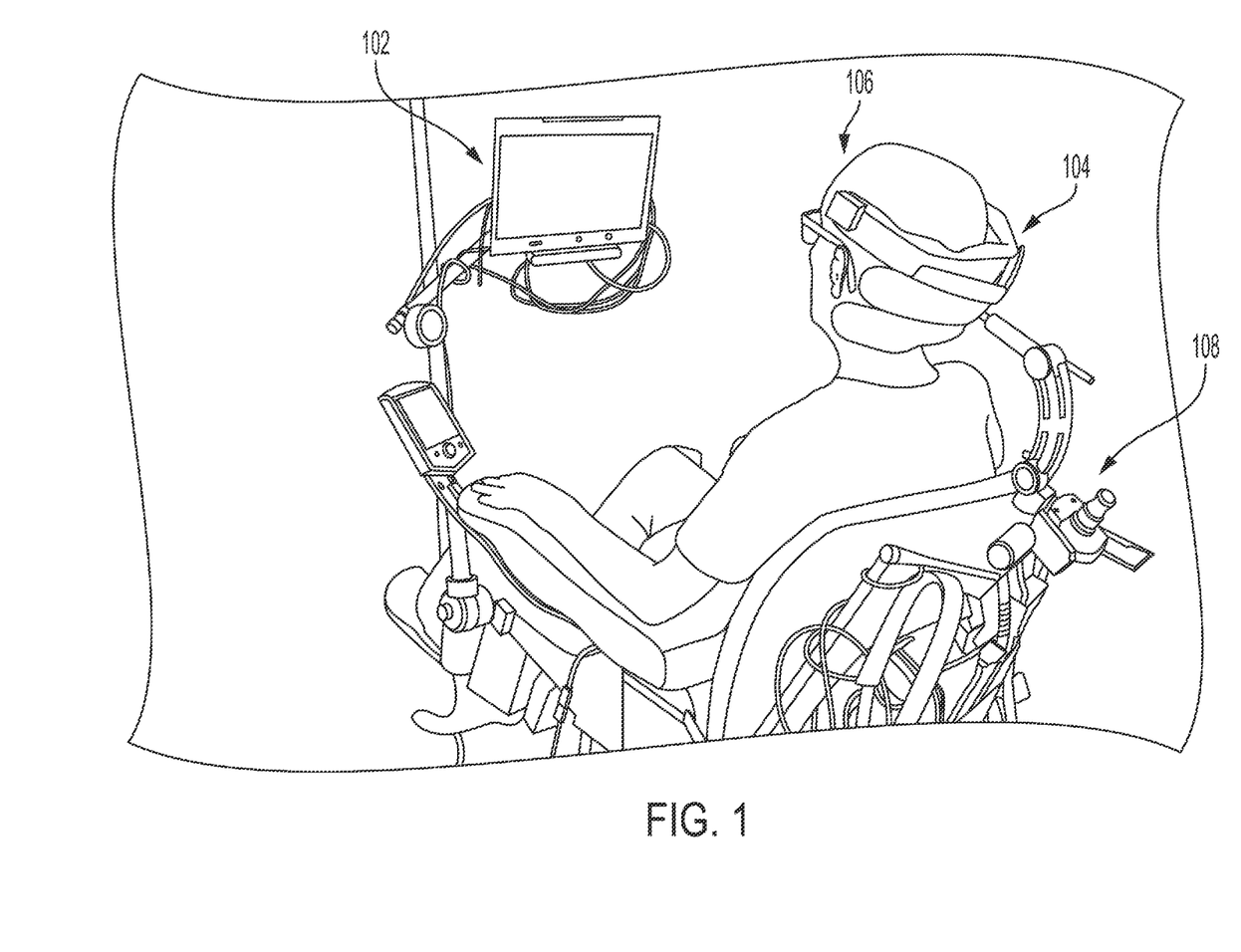
FIG. 1 illustrates an example of a brain-machine interface (BMI) decoder interpreting signals from a BMI device according to some embodiments.

FIG. 1 illustrates user with a graphical user interface 102 and motorized wheelchair 108. A brain-machine interface (BMI) decoder interprets signals from a BMI device 104. The BMI device 104 may be a BMI implant set within the skull 106 of a subject or may be a wearable device around a the subject's head. The BMI decoder may receive and decode neural signals from the BMI device 104 to output commands based on the neural signals. For example, the subject's neural signals may be decoded to operate wheelchair 108 or move a cursor on a GUI screen 102.

Figure 2:
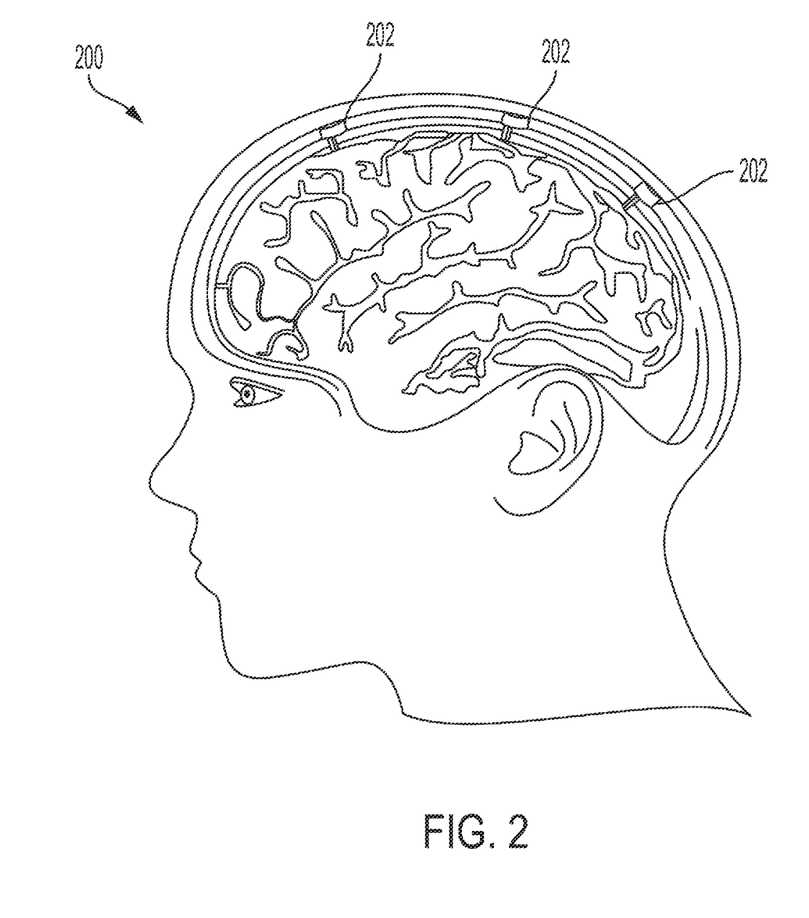
FIG. 2 illustrates a cross section of a human head with a system of three BMI implants set within holes in the subject's cranium (skull bone) according to some embodiments.

FIG. 2 illustrates a human head with system 200 of three BMI implants 202 set within holes in the subject's cranium (skull bone). They are located in different lobes, or areas of the brain, to capture or stimulate targeted sections. The holes, called "burr holes," are about 8 millimeters in diameter and drilled using specialized surgical tools. During surgery, thin film electrodes, sometimes numbering in the hundreds or thousands, are delicately inserted into the cortex at precise locations to avoid vasculature. The thin film electrodes merge into ribbon cable at one end, which in turn is pre-connected to the implant. Each implant is carefully set on top of the ribbon cable to cover the burr hole.

Within each implant 202 is circuitry, including integrated circuit (IC) chips, capacitors, and other components. The ICs receive from, and/or transmit to, the thin film electrodes that are surgically implanted within the subject's cranium. The ICs can include analog-to-digital converters (ADC) and/or digital-to-analog converters (DAC) in order to convert analog signals in the brain to or from digital signals of a computer.

Sitting in the burr hole, the bottom of each implant 202, and the entire implant, are awash with cerebrospinal fluid (CSF) and other body fluids. These fluids are corrosive to the silicon in the IC chips as well as other circuit components and must be sealed away from them. Therefore, the components are isolated within the implant in a mostly-glass or polymer container that is biologically neutral. The components are carefully positioned to interface with the thin film ribbon cable of what may be thousands of individual electrodes.

Figure 3:
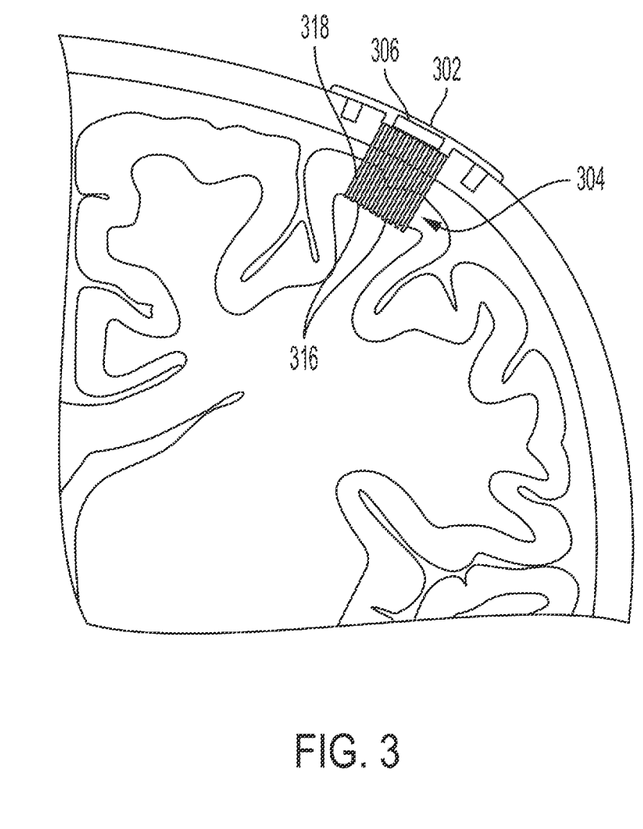
FIG. 3 is a cross section view of implanted electrodes according to some embodiments.

FIG. 3 is a cross section view of implanted electrodes in accordance with an embodiment. BMI implant 302 connects with thin film cable 304. Thin film cable 304 comprises electrodes 316 embedded in flexible polymer ribbon 318. Thin film cable 304 was manufactured using additive and subtractive microfabrication techniques, such as electroplating and photolithography. Thus, its electrodes 316 may have a rectangular cross section. The electrodes 316 can be extremely small, on the order of tens or hundreds of microns in effective diameter.

While joined at the upper end, thin film cable 304 splits into separate insulated wires, or threads, before descending into the brain. These different threads may have multiple electrodes 316 along their lengths that probe at different depths of the brain.

The BMI implant 302 may include an ADC 306 for receiving signals from the electrodes 316. The ADC 306 can convert voltages or currents received from the electrodes 316 and may detect spikes in the voltages or currents. The spikes can be forwarded as neural signals to a BMI decoder.

Example Biological Signals

Figure 4:
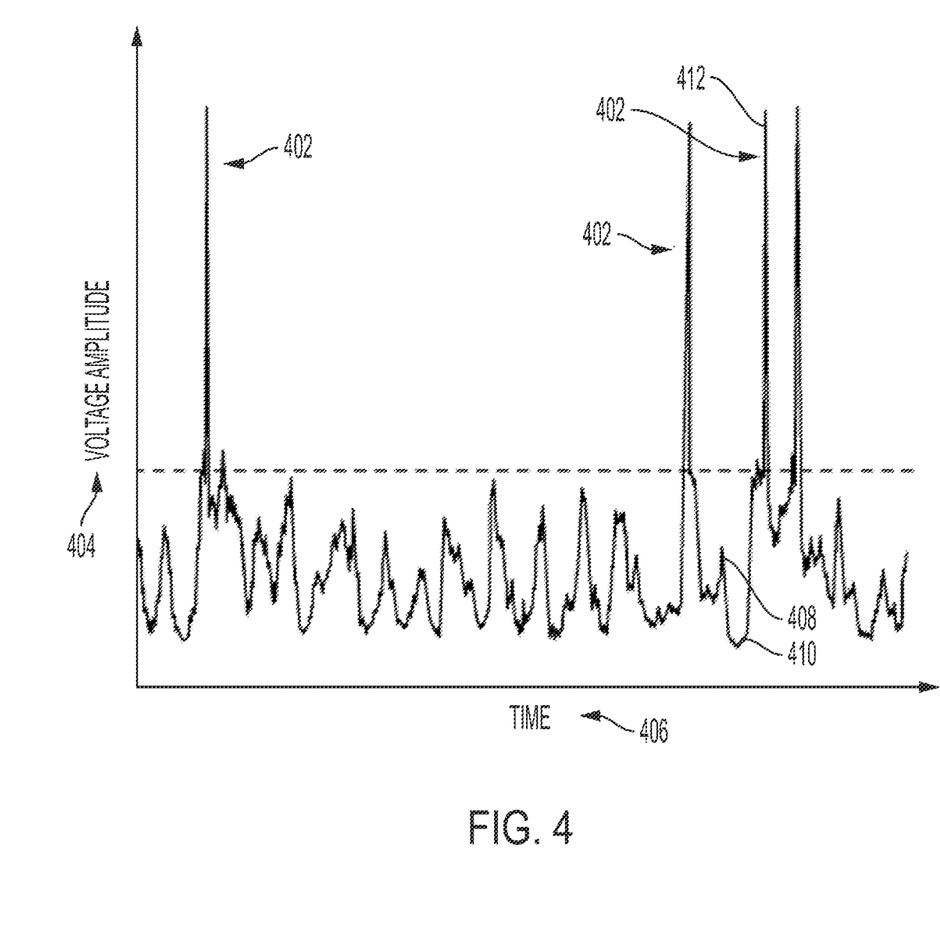
FIG. 4 illustrates an example of a graph of neural voltage over time according to some embodiments.

FIG. 4 illustrates an example of a graph 400 of neural voltage over time, including spikes 402 (e.g., neural spikes). Neural spikes are associated with a characteristic change in sample amplitude 404 over time 406. The sample amplitude may, for example, represent voltage, power, or frequency. As a specific example, the sample amplitude 404 is voltage in millivolts (mV).

A spike 402 is preceded by excitation and inhibition of a membrane. Cells such as neurons transport electrical signals using action potentials. An action potential is characterized by a voltage change across a cell membrane due to the flow of ions into and out of the neuron. Membranes are permeable to positively and negatively charged ions. The membranes are generally in a resting state. During depolarization, voltage-gated ion channels open due to an electrical stimulus. As ions rushes back into the cell, the charged ions modify the charge inside the cell (e.g., an influx of positive sodium ions raise the charge inside the cell from negative to positive). If a threshold is reached, then an action potential is produced. Once the cell has been depolarized, the voltage gated ion channels close. As charged ions exit the cell, the membrane potential falls and starts to approach the resting potential. Typically, repolarization overshoots the resting membrane potential, making the membrane potential more negative (hyperpolarization). An action potential is followed by a refractory period.

As illustrated in FIG. 4, a spike 402 can be characterized by characteristic rises and falls in sample amplitude. A signal may start out with an initial resting value, followed by a first positive change in sample amplitude 408, followed by a reduction in sample amplitude 410 below the resting value, and a second positive change in sample amplitude 412. The second positive change in sample amplitude 412 is generally greater than the first positive change in sample amplitude 408. In some embodiments, spikes in a biological signal are viewed in a shape space based on these characteristic changes in sample amplitude over time.

Figure 5:
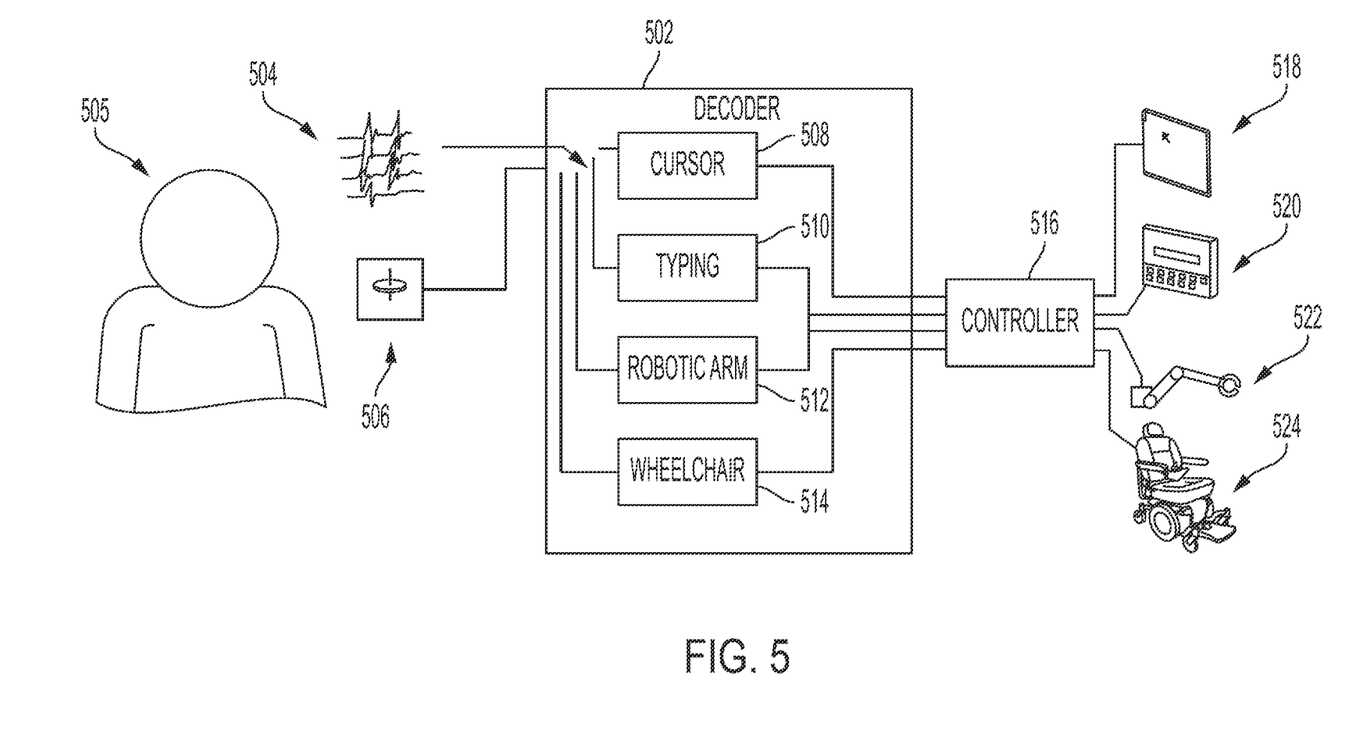
FIG. 5 is a diagram of a BMI decoder interpreting signals from a BMI device according to some embodiments.

FIG. 5 is a diagram of a BMI decoder 502 interpreting neural signals 504 from a BMI device according to some embodiments. The BMI device may be implanted within or worn by a subject 505 producing the neural signals 504. The BMI decoder 502 may decode the neural signals to determine actions to be performed for various activities. For example, the activities can include interacting with a graphical user interface (GUI) or manipulating a physical device. Gyroscope and inertial measurement unit (IMU) 506 track the user's head or body movements.

The BMI decoder 502 can include a model associated with each activity for translating neural signals into commands. For example, as depicted in the figure, the BMI decoder 502 includes a cursor model 508 for translating neural signals into movement and clicks of a cursor on a GUI, a typing model 510 for translating neural signals into typed or selected words on a GUI, a robotic arm model 512 for translating neural signals into movement of a robotic arm, and a wheelchair model 514 for translating neural signals into movement of a wheelchair. After translating the neural signals 504 using the appropriate model, the BMI decoder 502 can output a command based on the translated signals to a controller 516. The controller 516 can perform the command. Examples of commands performed can include the controller 516 causing a cursor 518 on a GUI to click a button or move the cursor 518 to a certain location at a certain velocity. It can also cause a word to be typed or backspaced using a keyboard 520 on a GUI, cause a robotic arm 522 to pick up or manipulate an object, or cause a wheelchair 524 to move forward at a certain velocity for a certain distance.

In some examples, the BMI decoder 502 can determine an activity change, such as a change from controlling the movement of a cursor 518 on a GUI to controlling the movement of a wheelchair 524. It can do this by interpreting movements from the IMU 506, for example when the user's head shifts to looking beyond the screen, or by other signals. In response to determining the activity change, the BMI decoder 502 can route the neural signals 504 from a first model to a second model, such as from the cursor model 508 to the wheelchair model 514. The BMI decoder 502 may then translate the neural signals 504 into a command using the wheelchair model 514 and may send the command to the controller 516. In some examples, the BMI decoder 502 may determine the activity change using a user-interface (UI) aware controller.

Figure 6:
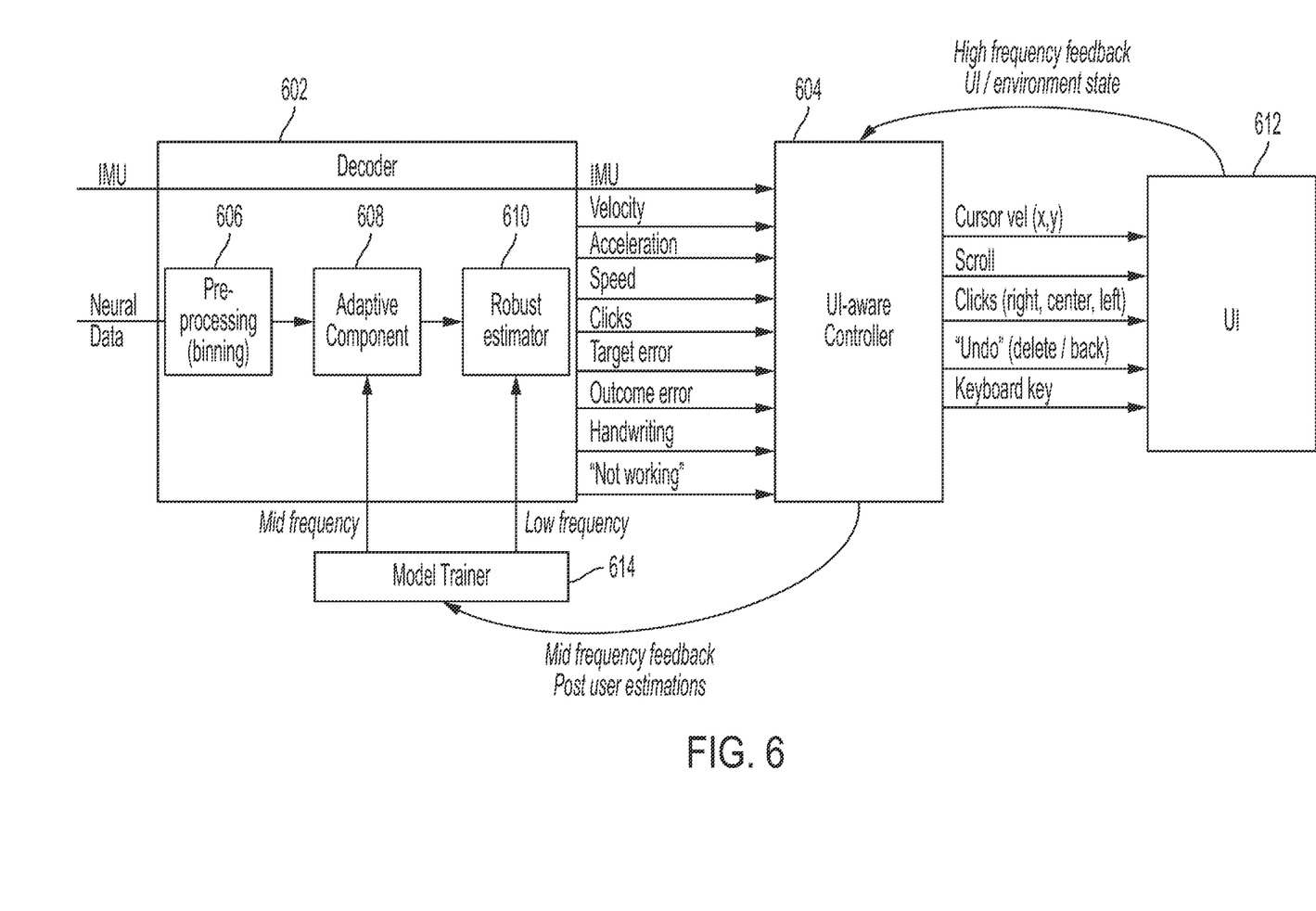
FIG. 6 is a diagram of a BMI decoder and a user-interface (UI) aware controller according to some embodiments.

FIG. 6 is a diagram of a BMI decoder 602 and a user-interface (UI) aware controller 604 according to some embodiments. The BMI decoder 602 can receive neural data, such as neural signals from a BMI. The BMI decoder 602 can include a pre-processing block 606, an adaptive component 608, and a robust estimator 610. The pre-processing block 606 can receive the neural signals and pre-process the neural signals in preparation for translating the neural signals. For example, the pre-processing block 606 may bin neural spikes within the neural signals based on their frequency. The pre-processing block 606 may forward the processed neural signals to the adaptive component 608.

The adaptive component 608 may include models for translating the neural signals into commands, such as the models described above in FIG. 5. The adaptive component 608 may forward the translated neural signals to the robust estimator 610.

The robust estimator 610 may estimate a command based on the translated neural signals. The BMI decoder 602 may send the command to the UI-aware controller 604 for performing the command in an environment 612, such as a UI or a physical device.

In some examples, the models in the adaptive component 608 and the robust estimator 610 may be continuously updated and trained using a model trainer 614 while the BMI decoder 602 is outputting commands. The model trainer 614 may receive feedback from the UI-aware controller 604, which may be receiving or determining feedback from the environment 612. In some examples, the feedback may be received in varying frequencies. For example, high-frequency feedback can include real-time information about the environment 612 with which the subject is interacting. The high-frequency feedback may be received every second or multiple times per second. High-frequency feedback can include the position and velocity of objects on a UI, such as cursors, buttons, keyboards, etc. High-frequency feedback can also include the position and movement of physical objects, such as the movement of a robotic arm or the position of an object near a robotic arm, which can be detected using an external camera. Mid-frequency feedback may be received every ten minutes. Mid-frequency feedback may include interpretations of subject intention after multiple movements have occurred or a task has been completed. For example, mid-frequency feedback may include information relating to multiple attempts to pick up a cup with a robotic arm. Successes and failures in picking up the cup with the robotic arm may be used by the model trainer 614 to update the adaptive component 608 and the robust estimator 610 to perform the action more successfully in the future. Low-frequency feedback may be received every 12 hours. Low-frequency feedback may include longer term information that can be used to update a "multi-day" model of the subject's preferences.

Figure 7:
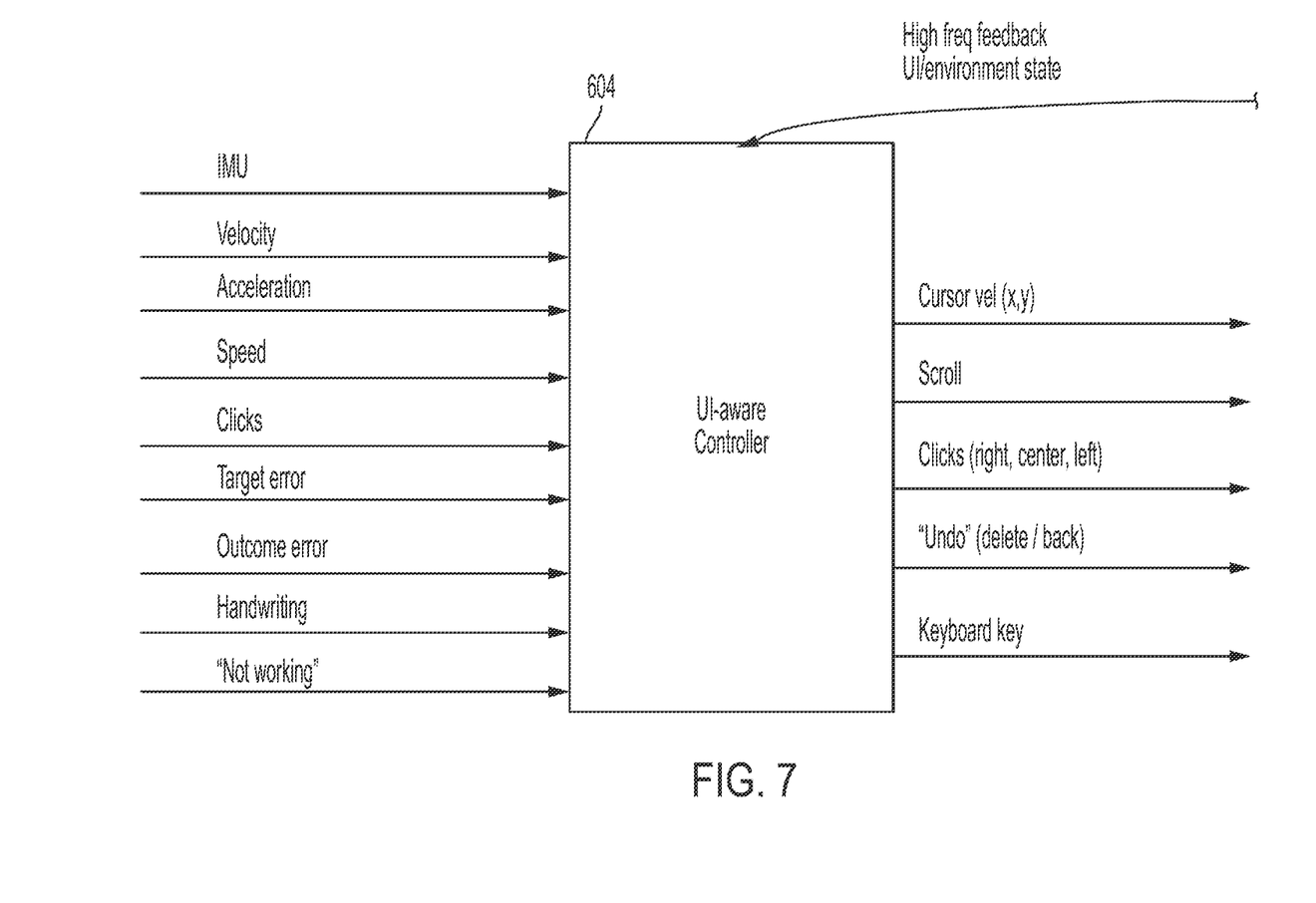
FIG. 7 is a diagram of the UI aware controller of FIG. 6.

FIG. 7 is a diagram of the UI-aware controller 604 of FIG. 6. The UI-aware controller 604 may be "aware" of the translated neural signals from the BMI decoder 602. For example, the UI-aware controller 604 may be aware of the type of activity being performed by the subject (such as typing words on a keyboard or picking up a cup with a robotic arm), the environment of the activity (such as a UI, the location of buttons on the UI, or the location of the cup on a table), the history of the activity (such as recent links opened on a browser), and the probability for certain commands to be performed in the future based on the history and environment. The UI-aware controller 604 may also be aware of external information feedback. The external information can include structured information, such as software or operating system data, and unstructured information, such as audio from a microphone or video from a camera.

In some examples, the UI-aware controller 604 may adjust commands or determine activity changes based on the neural signals or the feedback. For example, the UI-aware controller 604 may determine that a location of a cursor is on top of a text field. The UI-aware controller 604 may direct the BMI decoder 602 (see FIG. 6) to route neural signals to a keyboard model rather than a cursor model to output keyboard commands. The UI-aware controller 604 may also adjust commands based on the environment. For example, the UI-aware controller 604 may cause a cursor to snap to a close target, such as a button. The speed and accuracy of the cursor movement may be adjusted based on the density of the UI. For example, interacting with a UI displaying a web page with two buttons may become faster but less accurate, and interacting with a web page displaying multiple links may become slower but more accurate.

In some examples, the UI-aware controller 604 may adjust commands based on a subject's repeated behavior. For example, if the UI-aware controller 604 is outputting commands to a robotic arm to pick up an object on a table, the UI-aware controller 604 may direct the robotic arm to pick up a first drink rather than a second drink, based on a subject's history of preferring the first drink. The subject's preferences may be low-frequency feedback used to update models over longer periods. In another example, the UI-aware controller 604 may adjust commands to automatically perform actions based on the subject's daily routine, such as starting a video game at a certain time of day.

In some examples, the UI-aware controller 604 may adjust commands or determine activity changes based on detected subject frustration or detected errors. For example, the UI-aware controller 604 may receive an indication of a frustration from the subject, such a verbal noise of frustration detected by a microphone or a particular pattern of neural spikes detected by the electrodes. The UI-aware controller 604 may inhibit the command, such as by canceling the command. The UI-aware controller 604 may then adjust the command or switch an activity based on the frustration. For example, if the subject is trying to move a cursor past a button but the UI-aware controller 604 is snapping the cursor to the button, the UI-aware controller 604 may prevent snapping to close targets. If the subject is trying to switch from interacting with a keyboard to moving a wheelchair, the UI-aware controller 604 can cause the BMI decoder 602 to route neural signals from a keyboard model to a wheelchair model.

In another example, the UI-aware controller 604 may send mid-frequency feedback based on multiple detected errors. For example, the UI-aware controller 604 may detect that multiple backspace and delete commands have been received in a keyboard environment. The UI-aware controller 604 may determine that erroneous commands may have been output by the BMI decoder 602. The UI-aware controller 604 may send the mid-frequency feedback to the model trainer 614 to update the keyboard model based on the detected error.

In some examples, the UI-aware controller 604 may include models for adjusting commands received from the BMI detector 602. For example, the UI-aware controller 604 may include a language model to help a subject type faster. The language model may predict probable next letters or words based on recent letters and may display the predictions to the subject. The subject may select the predictions, which may be faster than typing out the letters or words. In other examples, the UI-aware controller 604 may incorporate external cues when adjusting commands. For example, if the subject is operating a robotic arm, the UI-aware controller 604 may receive audio from a microphone of the subject stating "I'm hungry." While the subject is reaching for an object on a table, the UI-aware controller 604 may adjust a movement command for the robotic arm to prioritize picking up a sandwich on the table over picking up a book on the table. In some examples, the UI-aware controller 604 may adjust commands based on a subject's verbal instructions, such as the subject stating "pick up the book."

In some examples, the BMI decoder 602 or the UI-aware controller 604 may adjust the efficiency of neural data transmitted from the neural implant. Data rates received from the neural implant may vary depending on the amount of neural activity in the brain. High data rates may cause bandwidth and latency issues, particularly when transmitting over wireless connections such as a BLUETOOTH® connection. In some examples, the neural signals can be selected to prioritize sending relevant data based on the current environment being controlled by neural signals from the subject. For example, if the subject is currently controlling a cursor on a UI, the neural signals may be selected to send only data relating to controlling a cursor. This can allow for better data compression, lower power consumption, and lower latency of the wireless connection by preventing re-transmissions. In one example, the neural spikes from the neural implant may be binned as a function of frequency. Each bin may be ranked based on how informative the bin is to the current activity. If the amount of neural data is higher than a predetermined threshold, bins may be removed from the neural signals based on the ranking by dropping the least informative data first.

Figure 8:
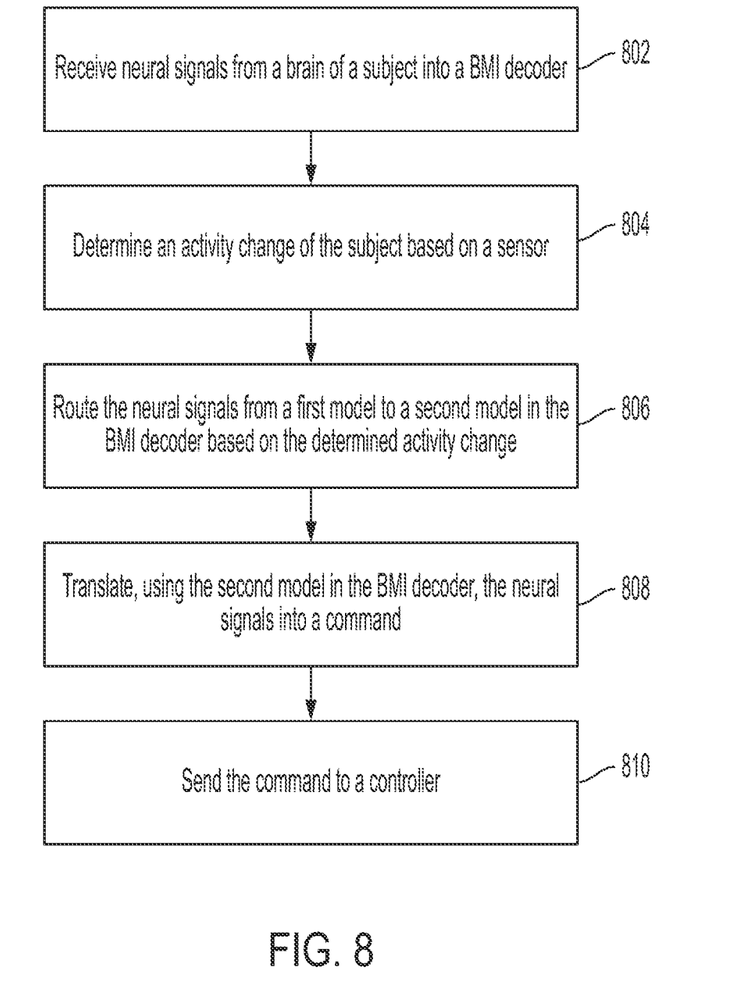
FIG. 8 is a flowchart of a process to interpret signals from a BMI according to some embodiments.

FIG. 8 is a flowchart of a process for interpreting signals from a BMI according to some embodiments. Although depicted as various steps occurring in a particular sequence or order, this is not intended to be limiting. In certain alternative embodiments, the steps may be performed in some different order or some steps may also be performed in parallel. In certain embodiments, the components discussed in connection with the depicted method may be the same or be configured in a similar manner as the components described above.

In operation 802, neural signals are received from a brain of a subject into a BMI decoder. The neural signals may pass through metal electrodes in a cerebral cortex of the subject's brain. In some examples, voltages or currents from the electrodes may be converted by an ADC. The ADC may detect spikes from the voltages or currents and may forward the spikes as neural signals to the BMI decoder.

In operation 804, the BMI decoder determines an activity change of the subject based on a sensor. For example, the sensor may be an external sensor such as a camera or microphone, or it can be internally decoded signals from a pattern of electrodes. A microphone may transmit a noise of frustration or a voice command directing an activity change to the BMI decoder. The activity change may be a change between the subject interfacing with a GUI and the subject manipulating a physical device. In some examples, the subject interfacing with the GUI may include moving a cursor, entering text, or selecting words. Manipulating the physical device may include operating a robotic arm or steering a wheelchair.

In operation 806, neural signals are routed from a first model to a second model in the BMI decoder based on the determined activity change. For example, if the activity change is from the subject interfacing with a GUI to the subject manipulating a physical device, the neural signals may be routed from a model for interpreting GUI commands to a model for interpreting physical device commands.

In operation 808, the neural signals are translated, using the second model in the BMI decoder, into a command. For example, the BMI decoder can use a cursor model to translate the neural signals into a cursor movement and velocity. In operation 810, the BMI decoder sends the command to a controller. The controller can control a cursor on a GUI according to the command. For example, the controller can move the cursor using the cursor movement and velocity determined by the BMI decoder based on the neural signals.

Figure 9:
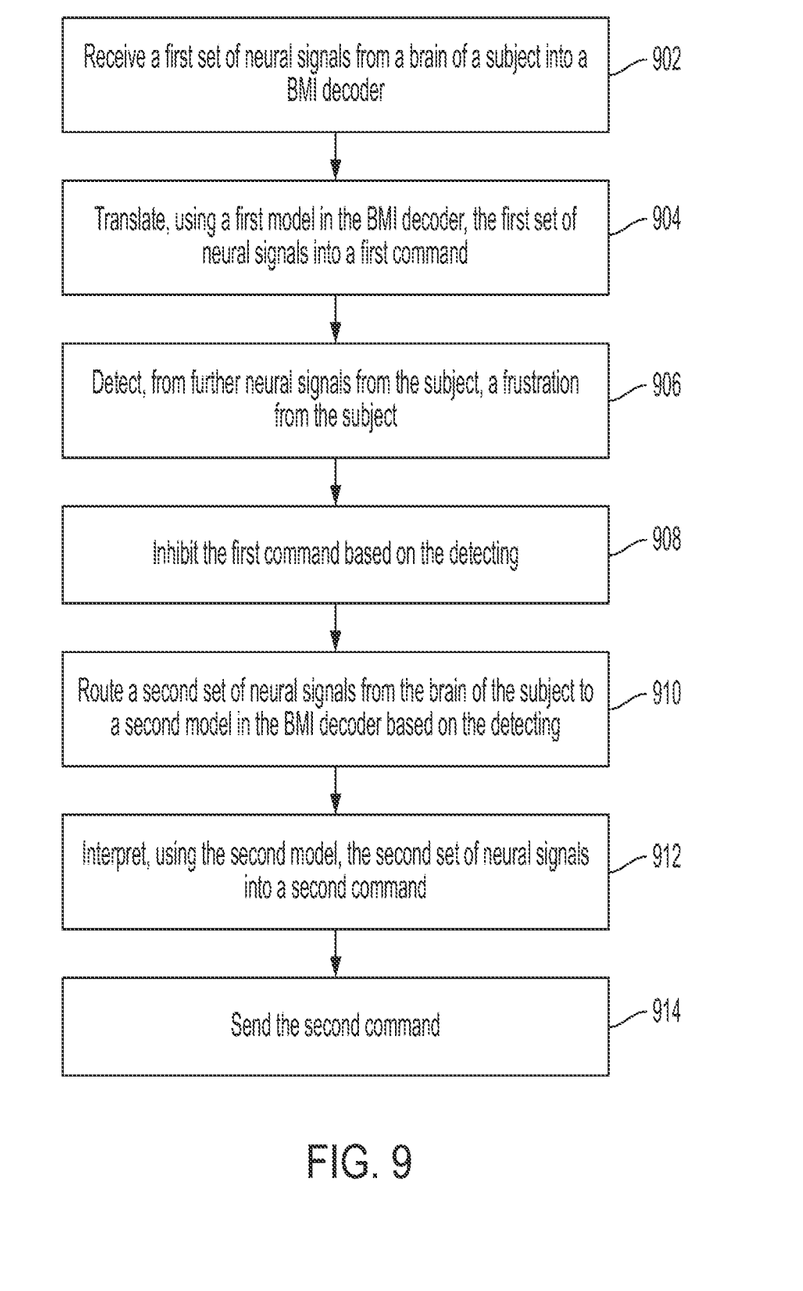
FIG. 9 is a flowchart of another process to interpret signals from a BMI according to some embodiments.

FIG. 9 is a flowchart of another process for interpreting signals from a BMI according to some embodiments. Although depicted as various steps occurring in a particular sequence or order, this is not intended to be limiting. In certain alternative embodiments, the steps may be performed in some different order or some steps may also be performed in parallel. In certain embodiments, the components discussed in connection with the depicted method may be the same or be configured in a similar manner as the components described above.

In operation 902, a first set of neural signals from a brain of a subject are received into a BMI decoder. Neural signals may pass through metal electrodes in a cerebral cortex of the subject's brain. In some examples, voltages or currents from the electrodes may be converted by an ADC. The ADC may detect spikes from the voltages or currents and may forward the spikes as neural signals to the BMI decoder.

In operation 904, the first set of neural signals are translated, using a first model in the BMI decoder, into a first command. For example, the first command may be typing letters using a keyboard onto a GUI. In operation 906, a frustration from the subject is detected from further neural signals from the subject. For example, neural signals interpreted as multiple repeated backspaces may indicate that the subject is frustrated with the typing commands being outputted by the BMI decoder.

In operation 908, the first command is inhibited based on the detecting. In some examples, inhibiting the first command may include sending a cancelation of the first command, such as canceling typing on a keyboard. In operation 910, a second set of neural signals from the brain of the subject are routed to a second model in the BMI decoder based on the detecting. For example, the second set of neural signals may be routed to a wheelchair model for steering a wheelchair, rather than typing on a keyboard. In operation 912, the second set of neural signals are interpreted, using the second model, into a second command. For example, the second model may be used to translate the second set of neural signals into a second command comprising a forward movement of the wheelchair with a certain velocity. In operation 914, the BMI controller sends the second command.

Figure 10:
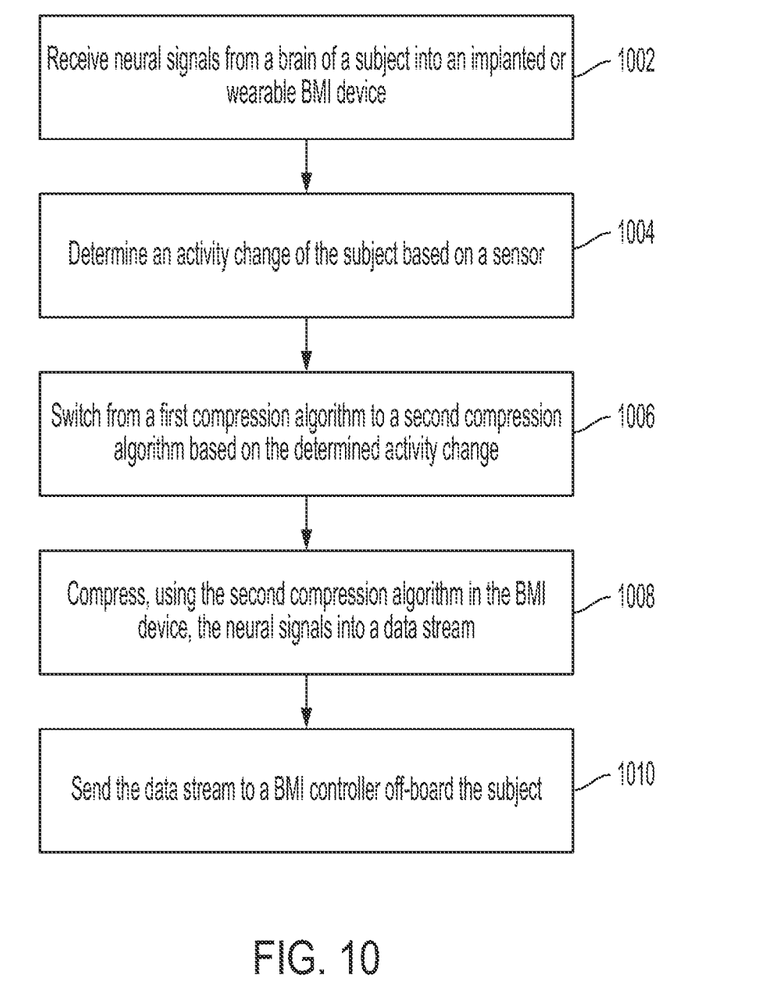
FIG. 10 is a flowchart of a process for adjusting an implanted or wearable BMI device according to some embodiments.

FIG. 10 is a flowchart of a process for adjusting an implanted or wearable BMI device according to some embodiments. Although depicted as various steps occurring in a particular sequence or order, this is not intended to be limiting. In certain alternative embodiments, the steps may be performed in some different order or some steps may also be performed in parallel. In certain embodiments, the components discussed in connection with the depicted method may be the same or be configured in a similar manner as the components described above.

In operation 1002, neural signals are received from a brain of a subject into an implanted or wearable BMI device. For example, the neural signals may pass through metal electrodes in a cerebral cortex of the brain. In some examples, voltages or currents from the electrodes may be converted by an ADC. The ADC may detect spikes from the voltages or currents and may forward the spikes as neural signals to the BMI decoder. The neural spikes may be binned as a function of frequency. In some examples, the neural signals may be transmitted to the BMI decoder via a BLUETOOTH® connection.

In operation 1004, an activity change of the subject is determined based on a sensor. For example, an activity change may be a change from neural signals being interpreted into commands for moving a cursor to neural signals being interpreted into commands for moving a robotic arm. The sensor may be a microphone or camera that may detect activity changes based on feedback from the subject.

In operation 1006, the BMI device switches from a first compression algorithm to a second compression algorithm based on the determined activity change. For example, the first compression algorithm may be used based on a first activity, such as moving a cursor. The first compression algorithm may compress the neural signals based on the first activity. For example, data that is unrelated to moving a cursor may be discarded before the neural signals are compressed and transmitted. After the activity change, the BMI device may switch to the second compression algorithm. The second compression algorithm may be associated with a second activity, such as moving a robotic arm. The second compression algorithm may prioritize different data in the neural signals compared to the first compression algorithm.

In operation 1008, the BMI device compresses, using the second compression algorithm in the BMI device, the neural signals into a data stream. For example, data that is unrelated to moving a robotic arm may be discarded before the neural signals are compressed. In operation 1010, the BMI device sends the data stream to a BMI controller off-board the subject. The BMI controller may perform a command based on the data stream. For example, the BMI controller may cause a robotic arm to move based on the neural signals from the BMI device.

It should be appreciated that a brain implant or other system and a respective control system for the brain implant can have one or more microprocessors/processing devices that can further be a component of the overall apparatuses. The control systems are generally proximate to their respective devices, in electronic communication (wired or wireless) and can also include a display interface and/or operational controls configured to be handled by a user to monitor the respective systems, to change configurations of the respective systems, and to operate, directly guide, or set programmed instructions for the respective systems, and sub-portions thereof. Such processing devices can be communicatively coupled to a non-volatile memory device via a bus. The non-volatile memory device may include any type of memory device that retains stored information when powered off. Non-limiting examples of the memory device include electrically erasable programmable read-only memory ("ROM"), flash memory, or any other type of non-volatile memory. In some aspects, at least some of the memory device can include a non-transitory medium or memory device from which the processing device can read instructions. A non-transitory computer-readable medium can include electronic, optical, magnetic, or other storage devices capable of providing the processing device with computer-readable instructions or other program code. Non-limiting examples of a non-transitory computer-readable medium include (but are not limited to) magnetic disk(s), memory chip(s), ROM, random-access memory ("RAM"), an ASIC, a configured processor, optical storage, and/or any other medium from which a computer processor can read instructions. The instructions may include processor-specific instructions generated by a compiler and/or an interpreter from code written in any suitable computer-programming language, including, for example, C, C++, C#, Java, Python, Perl, JavaScript, etc.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

In some embodiments, the systems and methods of the present disclosure can be used in connection with neurosurgical techniques. However, one skilled in the art would recognize that neurosurgical techniques are a non-limiting application, and the systems and methods of the present disclosure can be used in connection with any biological tissue. Biological tissue can include, but is not limited to, the brain, muscle, liver, pancreas, spleen, kidney, bladder, intestine, heart, stomach, skin, colon, and the like.

The systems and methods of the present disclosure can be used on any suitable multicellular organism including, but not limited to, invertebrates, vertebrates, fish, bird, mammals, rodents (e.g., mice, rats), ungulates, cows, sheep, pigs, horses, non-human primates, and humans. Moreover, biological tissue can be ex vivo (e.g., tissue explant), or in vivo (e.g., the method is a surgical procedure performed on a patient).

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples; alternative implementations may employ differing values or ranges, and can accommodate various increments and gradients of values within and at the boundaries of such ranges.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

What is claimed is:

1. A method of interpreting signals from a brain-machine interface (BMI), the method comprising:
    receiving a first set of neural signals from a brain of a subject into a BMI decoder;
    translating, using a first model in the BMI decoder, the first set of neural signals into a first command;
    detecting, from further neural signals from the subject, a frustration from the subject;
    inhibiting the first command by sending a cancelation of the first command, the inhibiting based on the detecting;
    routing a second set of neural signals from the brain of the subject to a second model in the BMI decoder based on the detecting;
    interpreting, using the second model, the second set of neural signals into a second command; and
    sending the second command.

2. The method of claim 1 wherein the second command is sent to a cursor, a keyboard, a robotic arm, or a wheelchair.

3. The method of claim 1 wherein the neural signals pass through metal electrodes in a cerebral cortex of the brain.

4. The method of claim 3 further comprising:
    converting, through an analog-to-digital converter (ADC), voltages or currents from the electrodes;
    detecting spikes from the voltages or currents; and
    forwarding the spikes as the neural signals.

5. The method of claim 1 wherein the first or second model includes binning neural spikes as a function of frequency.

6. A method of adjusting an implanted or wearable brain-machine interface (BMI) device, the method comprising:
    receiving neural signals from a brain of a subject into an implanted or wearable BMI device;
    determining an activity change of the subject based on a sensor;
    switching from a first compression algorithm to a second compression algorithm based on the determined activity change;
    compressing, using the second compression algorithm in the BMI device, the neural signals into a data stream;
    sending the data stream to a BMI controller off-board the subject.

7. The method of claim 6 wherein the activity change is a change between the subject interfacing with a graphical user interface (GUI) to the subject manipulating a physical device.

8. The method of claim 7 wherein the activity change is from the subject interfacing with a graphical user interface (GUI) to the subject manipulating a physical device.

9. The method of claim 7 wherein the interfacing with the GUI involves moving a cursor, entering text, or selecting words, and the manipulating a physical device involves operating a robotic arm or steering a wheelchair.

10. The method of claim 6 wherein the neural signals pass through metal electrodes in a cerebral cortex of the brain.

11. The method of claim 10 further comprising:
    converting, through an analog-to-digital converter (ADC), voltages or currents from the electrodes;
    detecting spikes from the voltages or currents; and
    forwarding the spikes as the neural signals.

12. The method of claim 6 wherein the first or second compression algorithm includes binning neural spikes as a function of frequency.

* * * * *